United States Patent
Stilin

(10) Patent No.: US 11,408,291 B2
(45) Date of Patent: Aug. 9, 2022

(54) AIRFOIL CONFORMABLE MEMBRANE EROSION COATING

(71) Applicant: United Technologies Corporation, Farmington, CT (US)

(72) Inventor: Nicholas D. Stilin, Higganum, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 474 days.

(21) Appl. No.: 16/047,319

(22) Filed: Jul. 27, 2018

(65) Prior Publication Data

US 2020/0032660 A1 Jan. 30, 2020

(51) Int. Cl.
| | |
|---|---|
| *B32B 3/10* | (2006.01) |
| *F01D 5/28* | (2006.01) |
| *B32B 15/08* | (2006.01) |
| *B32B 7/12* | (2006.01) |
| *B32B 15/01* | (2006.01) |

(52) U.S. Cl.
CPC ............... *F01D 5/288* (2013.01); *B32B 7/12* (2013.01); *B32B 15/01* (2013.01); *B32B 15/08* (2013.01); *B32B 2250/02* (2013.01); *B32B 2307/554* (2013.01); *B32B 2603/00* (2013.01); *F05D 2220/32* (2013.01); *F05D 2240/12* (2013.01); *F05D 2240/30* (2013.01); *F05D 2300/171* (2013.01); *F05D 2300/174* (2013.01); *F05D 2300/43* (2013.01); *F05D 2300/44* (2013.01); *F05D 2300/603* (2013.01); *F05D 2300/611* (2013.01); *Y10T 428/12361* (2015.01)

(58) Field of Classification Search
None
See application file for complete search history.

(56) References Cited

U.S. PATENT DOCUMENTS

| | | | | |
|---|---|---|---|---|
| 1,919,984 | A * | 7/1933 | Murphy | H01J 19/00 445/47 |
| 3,900,629 | A * | 8/1975 | Spencer | B32B 3/10 428/593 |
| 4,262,059 | A * | 4/1981 | Frankowski | B21D 31/00 29/527.4 |
| 5,449,273 | A | 9/1995 | Hertel et al. | |
| 6,532,658 | B2 | 3/2003 | Schreiber | |
| 9,587,497 | B2 | 3/2017 | Hunziker et al. | |
| 2002/0081921 | A1* | 6/2002 | Vargo | B32B 15/08 442/16 |
| 2002/0184936 | A1* | 12/2002 | Gitlin | B21D 5/00 72/379.2 |
| 2005/0242233 | A1* | 11/2005 | Battisti | F03D 80/40 244/58 |

(Continued)

FOREIGN PATENT DOCUMENTS

WO WO97/27370 * 7/1997

*Primary Examiner* — Seth Dumbris
(74) *Attorney, Agent, or Firm* — Bachman & LaPointe, P.C.

(57) ABSTRACT

A coating membrane for a component of a gas-turbine engine includes a solid membrane having a metallic foil or a polymeric film, and having a thickness and at least one kerf extending through the thickness to define a kerf pattern such that the solid membrane can be applied to a compound-curved surface. Also disclosed are a coated component coated with the membrane, and a method for producing a coated component with the membrane.

10 Claims, 3 Drawing Sheets

(56) References Cited

U.S. PATENT DOCUMENTS

| | | | | |
|---|---|---|---|---|
| 2006/0104807 A1* | 5/2006 | Lee | ............................ | F01D 5/20 |
| | | | | 415/115 |
| 2010/0301161 A1* | 12/2010 | Chene | ..................... | B64D 33/02 |
| | | | | 244/1 N |
| 2015/0184527 A1* | 7/2015 | Kray | ...................... | C22C 19/057 |
| | | | | 416/224 |
| 2017/0321714 A1* | 11/2017 | Jain | ....................... | F04D 29/023 |
| 2018/0257790 A1* | 9/2018 | Rahamat | ................ | C23C 28/046 |
| 2018/0328189 A1* | 11/2018 | Frey | ...................... | F04D 29/324 |

\* cited by examiner

AIRFOIL CONFORMABLE MEMBRANE EROSION COATING

BACKGROUND OF THE DISCLOSURE

The disclosure relates to protection of components in gas-turbine engines and the like from erosion and to provide impact resistance. More particularly, the disclosure relates to a conformable membrane coating.

Laminate polymer matrix composites (PMCs) are used to form both rotating (blades) and stationary (vanes) airfoils for use in airborne propulsion gas-turbines. PMCs are utilized for various reasons, particularly to save weight. Unfortunately, these materials do not possess erosion resistance comparable to metallic materials and often require erosion resistant coatings to meet required life expectancy.

Many erosion resistant coatings are elastomers that have maximum usage temperatures that limit their use. An erosion coating that could endure high temperature environments would be beneficial. In addition, an erosion coating that could be applied where traditional spraying (line of sight) or tank dipping is not feasible would also be beneficial.

The present disclosure addresses these issues.

SUMMARY OF THE INVENTION

The present disclosure relates to a solid membrane for providing erosion resistance to airfoils and other like components, particularly to those which are made from polymer matrix composites. The membrane is comprised of a metallic foil or polymeric film which is flexible and which has a kerf pattern defined thereon to enhance flexibility of the solid membrane.

In one configuration, a coating membrane for a component of a gas-turbine engine comprises a solid membrane comprising a metallic foil or a polymeric film, and having a thickness and at least one kerf extending through the thickness to define a kerf pattern such that the solid membrane can be applied to a compound-curved surface.

In another non-limiting configuration, the solid membrane comprises a metallic foil.

In a further non-limiting configuration, the metallic foil is selected from the group consisting of foils of titanium alloy, nickel alloy, stainless ferrous alloy and combinations thereof.

In a further non-limiting configuration, the solid membrane comprises a polymeric film.

In a still further non-limiting configuration, the polymeric film is selected from the group consisting of films of epoxy resin, polyphenylene ether, polyurethane and combinations thereof.

In still another non-limiting configuration, the polymeric film is an elastomeric film.

In a further non-limiting configuration, the polymeric film is fiber reinforced.

In a still further non-limiting configuration, the solid membrane has a thickness of between about 0.003 and about 0.030 inches.

In a further non-limiting configuration, the at least one kerf has a kerf width of between 0.002 and 0.006 inches.

In another non-limiting configuration, the kerf pattern defines a reticulated kerf pattern in a monolithic membrane structure.

In still another non-limiting configuration, the kerf pattern is a recurring pattern of intersecting kerfs.

In a further non-limiting configuration, the kerf pattern is defined by the at least one kerf in a spiral pattern.

In another non-limiting configuration, a coated gas-turbine engine component comprises a surface of a gas-turbine engine component; a solid membrane comprising a metallic foil or a polymeric film, the membrane having a thickness and at least one kerf extending through the thickness to define a kerf pattern, wherein the solid membrane is bonded to the surface.

In still another non-limiting configuration, the surface is a compound-curved surface, and the solid membrane conforms to the compound-curved surface.

In a further non-limiting configuration, the surface comprises a polymer matrix composite material.

In a further non-limiting configuration, a method for applying an erosion resistant coating to a component of a gas-turbine engine comprises applying a solid membrane to a surface of a component of a gas-turbine engine, the solid membrane comprising a metallic foil or a polymeric film, the membrane having a thickness and at least one kerf extending through the thickness to define a kerf pattern; and bonding the solid membrane to the surface.

In a still further non-limiting configuration, the surface is a compound-curved surface, and the applying step conforms the solid membrane to the compound-curved surface.

In another non-limiting configuration, the bonding step comprises co-curing the solid membrane with the component.

In still another non-limiting configuration, the bonding step comprises adhesively bonding the solid membrane to the component.

In a further non-limiting configuration, the surface comprises a polymer matrix composite material.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

The invention relates to a conformable membrane coating for providing erosion and/or impact resistance to components of a gas-turbine engine. The coating is particularly suitable for components having curved or compound-curved surfaces such as airfoils or the like.

Figure 1:
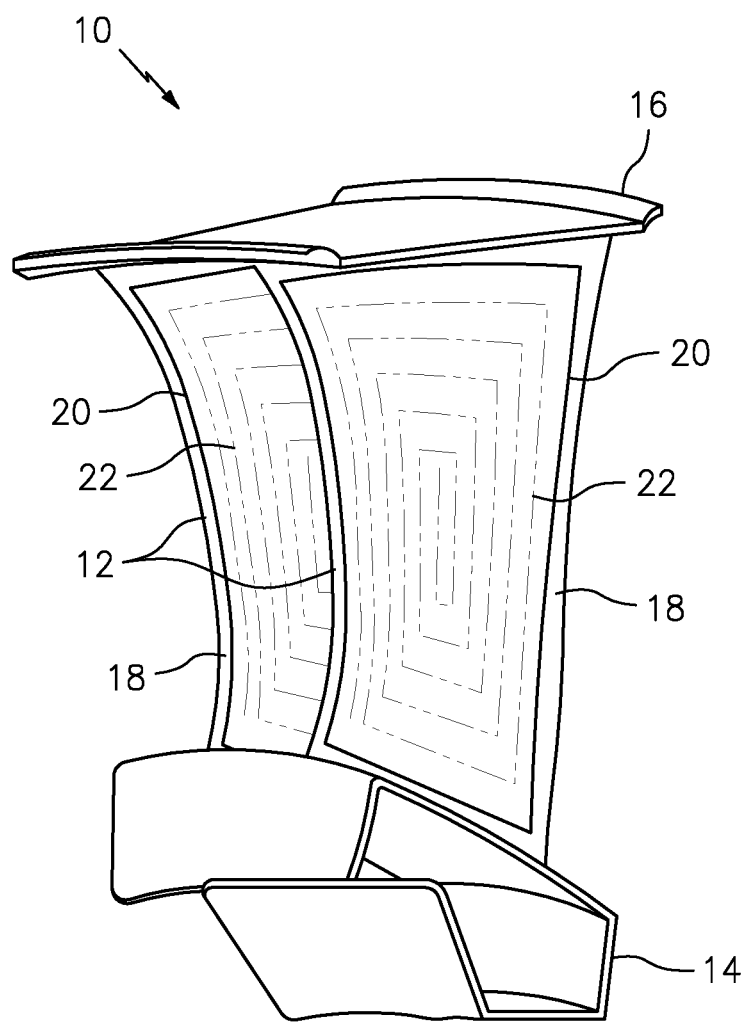
FIG. 1 illustrates a polymer matrix composite component of a gas-turbine engine with a conformable erosion resistant coating according to one non-limiting embodiment of the disclosure.

FIG. 1 shows an airfoil component 10, with two vanes 12 illustrated. Vanes 12 have a root or base structure 14 at one end and outer structure 16 at the other end for mounting to other components of the gas-turbine engine (not shown). Between structures 14, 16, vanes 12 have a compound-curved surface 18 which is curved and contoured to produce desired fluid flow. In the course of operation of the gas-turbine engine, components such as vanes 12 are impacted by high-velocity particulate matter and possible other solid materials which can cause issues of erosion as well as damage. Thus, vanes 12 need erosion and impact resistance.

In a gas-turbine engine setting, weight is always a concern, and components such as vanes 12 and the like are frequently manufactured from light materials such as polymer matrix composites (PMCs). PMCs have good properties from a weight and performance standpoint, but are particularly susceptible to erosion and impact damage. Thus, for PMCs, providing erosion and impact resistance is of particular importance.

FIG. 1 shows vanes 12 having a coating in the form of a membrane 20. In this illustration, vanes 12 are part of a stator, with membrane 20 applied to the airfoil pressure surface of the stator. Of course, membrane 20 could be applied in numerous other locations throughout the gas-turbine engine.

Membrane 20 is provided from a metallic foil or polymeric film such that the material has some flexibility itself. In addition, membrane 20 is provided with one or more kerfs 22, or very narrow slits, which define a kerf pattern that provides even further flexibility and conformability to membrane 20. Kerfs 22 allow membrane 20 to closely conform to the particular contours of the component or component surface to be coated. Thus, membrane 20 as disclosed herein is well suited for use on curved surfaces such as airfoils, or blade leading or trailing edges or the like.

Membrane 20 can in one non-limiting embodiment be provided from metallic foil such as, for example titanium alloy foil, nickel alloy foil, stainless ferrous foil, aluminum foil and the like. These materials are well-suited to providing a membrane with excellent erosion resistance and impact resistance, while also being able to tolerate the high temperatures to which they will be exposed without losing their erosion and impact resistant properties.

In another non-limiting embodiment, membrane 20 can be provided from polymeric film such as, for example, epoxy resin film, polyphenylene ether (PPE) film, polyurethane film, elastomeric films or the like. Such films can be fiber reinforced if desirable. Again, polymeric films as disclosed herein can provide excellent erosion and impact resistance while also being able to tolerate high temperature operating conditions without losing erosion and impact resistant properties.

Membrane 20 can have a thickness of between about 0.003 and 0.030 inches (3-30 thousandths), depending primarily upon the application and how much erosion or impact resistance is desired. Membrane 20 has kerfs 22 passing through the thickness of membrane 20 and defining a kerf pattern which provides additional flexibility to membrane 20. In FIG. 1, the kerf pattern depicted is a spiral kerf pattern wherein the entire pattern is defined by a single spiraling kerf. Such a kerf pattern, as well as others to be disclosed below, provide good flexibility to membrane 20, for example by allowing in-plane shear along the kerfs which helps membrane 20 drape or conform to compound-curved surfaces without wrinkling or other problems, while maintaining membrane 20 as a single monolithic component. It should be appreciated that a thin foil should be sufficient for erosion protection, but thicker foils could be considered for impact protection. Foils with non-constant thickness could also be applied, such as a thicker membrane in areas where impact resistance is desirable.

Kerfs can have a width which is sufficiently narrow that particle impacts are not likely to damage the membrane. For example, in one non-limiting embodiment, kerfs can have a width of between about 0.002 and 0.006 inches (2 and 6 thousandths). Some flexibility is provided by kerfs in the form of notches in the surface of the membrane, but the best flexibility is found when kerfs pass through the entire thickness of the membrane. As set forth above, this allows for shearing in-plane along the kerf to make portions of the membrane highly mobile relative to the rest of the membrane. Kerf width should be sufficiently small that breeching by erosive particles does not occur. In some instances, it may be desirable to enhance surface continuity with infiltration of adhesive or matrix resin. In all cases, the reticulated pattern provides drapability to the membrane but is constructed such that the resulting membrane remains monolithic. No kerf subdivides the membrane into multiple pieces.

Figure 2:
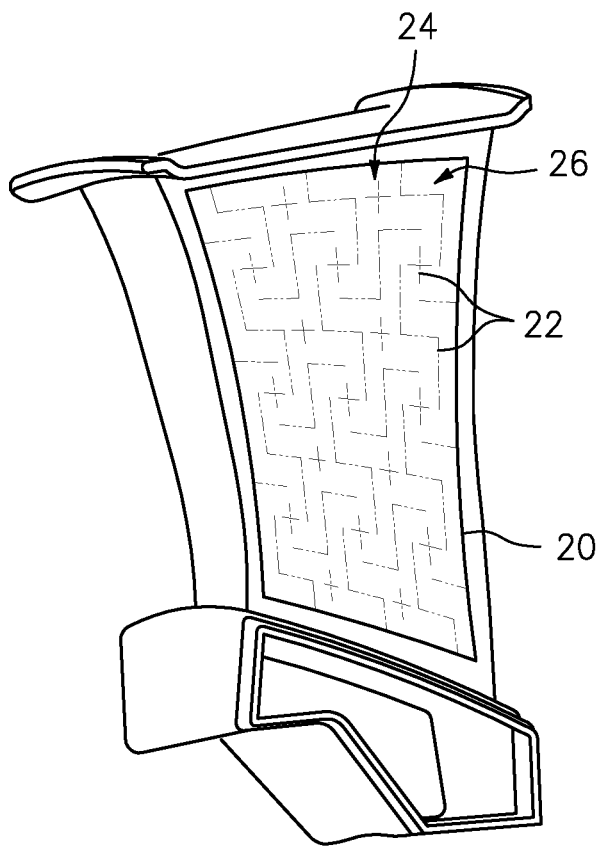
FIG. 2 shows a non-limiting embodiment of a kerf pattern on a conformable erosion resistant coating.

FIG. 2 illustrates an alternative and non-limiting embodiment of a different kerf pattern which is formed by two interspersed repeating patterns, one in the form of a small cross 24 and the other in the form of a Z (illustrated at 26). The Z patterns are rotated to different orientations through the kerf pattern.

Figure 3:
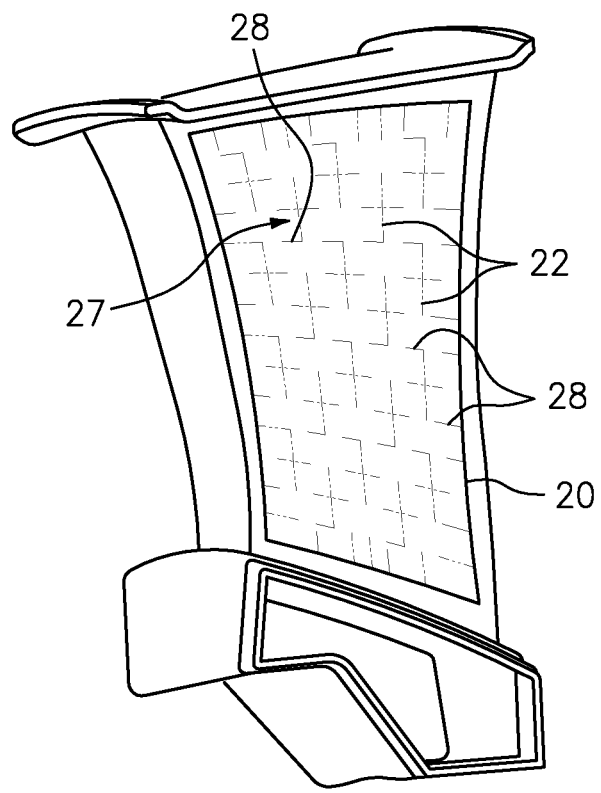
FIG. 3 shows another non-limiting embodiment of a kerf pattern on a conformable erosion resistant coating.

FIG. 3 illustrates another alternative and non-limiting embodiment with still a different kerf pattern which is formed by mirror image interspersed kerfs, in this case in the form of a cross 27 with one flag (illustrated at 28).

Figure 4:
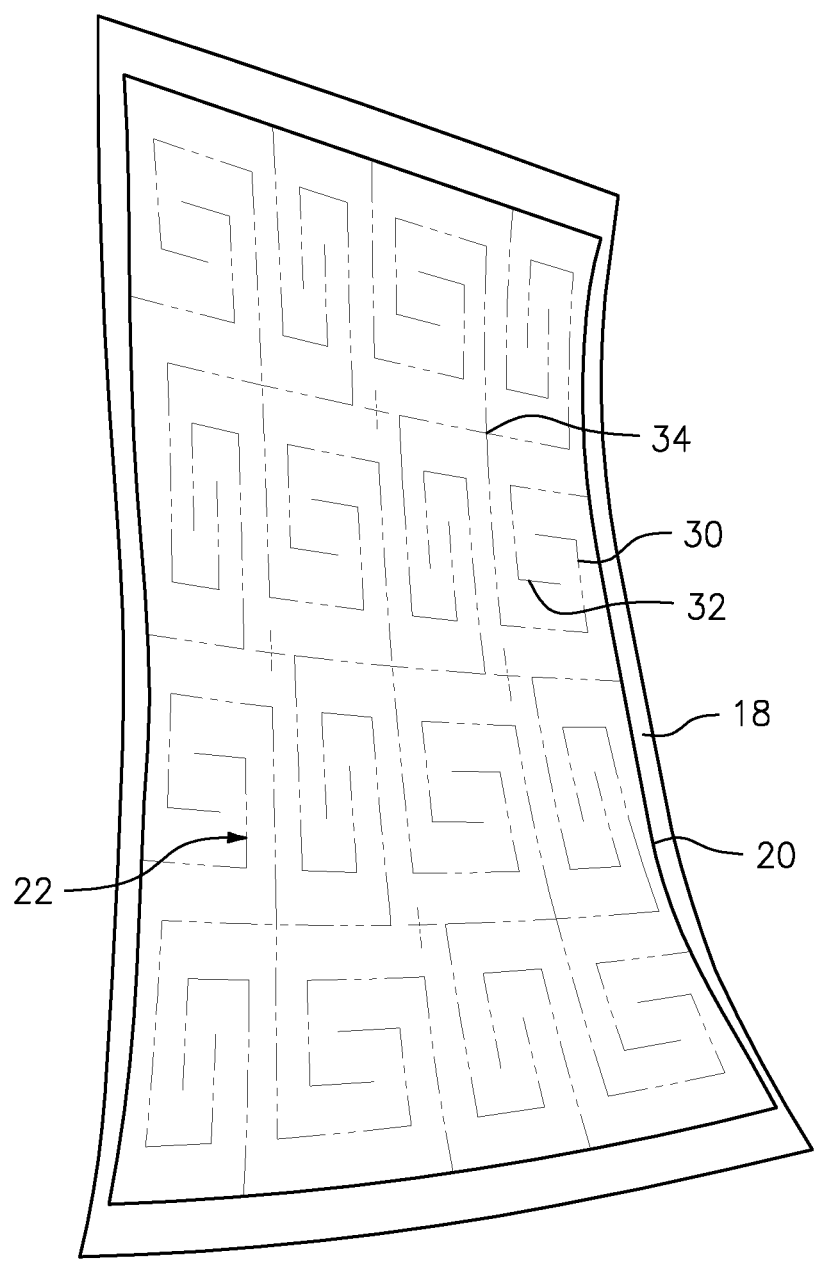
FIG. 4 shows another non-limiting embodiment of a kerf pattern on a conformable erosion resistant coating.

FIG. 4 depicts another embodiment with a repeating, interlocking kerf pattern. This pattern is formed by interlocking oppositely wound spiral kerfs 30, 32 which can be at least partially connected at junctions 34.

As should be apparent from a consideration of FIGS. 2-4, kerfs 22 can be produced in membrane 20 in a number of different patterns. The primary concerns in these patterns is to produce a membrane which is suitably flexible or drapable so that membrane 20 can be positioned in close conformity to a complex-curved surface such as that of an airfoil or leading or trailing edge of a blade. All these patterns produce excellent flexibility and also maintain membrane 20 as a monolithic structure, albeit one which is frangible as is desirable and further discussed below.

Kerfs 22 can be formed into membrane 20 in a number of different ways, but one particularly suitable manner is with a laser, which is well-suited to producing uniform slots of repeating patterns and with very narrow width of the slot. Of course, the kerfs can be produced in other manners as well, and although laser kerfs are particularly well-suited to the present disclosure, other methods are possible.

The kerf pattern to be utilized can be further directed by the specific component to be coated and protected. In any event, however, kerfs also serve to discretize membrane 20 so that membrane 20 is frangible. In the event a portion of membrane 20 breaks away from the component, kerfs provide breaking points so that only a small portion breaks away. This makes the coating useful in gas-turbine engines not only in bypass flow locations, but also in engine core flow locations.

It is also particularly suitable for the kerf pattern to be sufficiently applied to the membrane such that drapability and frangibility is maintained. This produces a desirable flexibility for use in conforming to a desired compound-curved surface, and also to sharply bending surfaces such as blade leading or trailing edges.

Coating using a solid membrane according to this disclosure can provide for coating components that cannot be properly coated with other techniques such as dipping or spraying, and also produces an erosion and impact resistance coating which is not limited in temperatures to which it can be exposed.

The resulting coated component can be any suitable component of a gas-turbine engine such as, but not limited to, an airfoil of a blade or vane, and particularly at surfaces which are subject to impact or erosion and have compound or complex curved surfaces, or sharp curved surfaces, or both.

The coating can be applied by draping the membrane over the surface to be protected, such that the flexibility provided by the material and the kerf pattern allows the membrane to closely follow contours of the surface. The membrane can be bonded to the surface through any method known to a person of ordinary skill in the art, but particularly suitable methods include co-cured during lamination, for example with a PMC component, or can be or adhesively bonded, which can be done after curing.

It should be appreciated that the thin metallic foil provides erosion and impact damage resistance to substrates requiring enhanced erosion or impact damage tolerance. The metallic coating may be used where other coatings and coating techniques cannot be used due to use temperature limitations. The kerf pattern promotes frangibility of the membrane should it liberate wholly or in part during engine operation, minimizing or eliminating damage to downstream hardware.

One or more embodiments of the present invention have been described. Nevertheless, it will be understood that various modifications may be made without departing from the spirit and scope of the invention. For example, different sources of images and/or types of images can be utilized. Accordingly, other embodiments are within the scope of the following claims.

What is claimed is:

1. A coating membrane for a component of a gas-turbine engine, comprising:
    a solid membrane comprising a metallic foil and having a thickness and at least one kerf extending through the thickness to define a kerf pattern such that the solid membrane can be applied to a compound-curved surface, wherein the kerf pattern is defined by at least one elongated slit passing through the solid membrane and having a width of between 0.002 and 0.006 inches, wherein the solid membrane comprises a metallic foil selected from the group consisting of foils of titanium alloy, nickel alloy, stainless ferrous alloy and combinations thereof, and wherein the kerf pattern defines a reticulated kerf pattern such that the metallic foil is a monolithic membrane structure.

2. The coating membrane of claim 1, wherein the solid membrane has a thickness of between about 0.003 and about 0.030 inches.

3. The coating membrane of claim 1, wherein the kerf pattern is a recurring pattern of intersecting kerfs.

4. The coating membrane of claim 1, wherein the kerf pattern is defined by the at least one kerf in a spiral pattern.

5. A coated gas-turbine engine component, comprising:
    a surface of a gas-turbine engine component;
    a solid membrane comprising a metallic foil or a polymeric film, the membrane having a thickness and at least one kerf extending through the thickness to define a kerf pattern, wherein the solid membrane is bonded to the surface, wherein the kerf pattern is defined by at least one elongated slit passing through the solid membrane and having a width of between 0.002 and 0.006 inches, wherein the solid membrane comprises a metallic foil selected from the group consisting of foils of titanium alloy, nickel alloy, stainless ferrous alloy and combinations thereof, and wherein the kerf pattern defines a reticulated kerf pattern such that the monolithic foil is a monolithic membrane structure.

6. The coated gas-turbine engine component of claim 5, wherein the surface is a compound-curved surface, and wherein the solid membrane conforms to the compound-curved surface.

7. The coated gas-turbine engine component of claim 5, wherein the surface comprises a polymer matrix composite material.

8. A method for applying an erosion resistant coating to a component of a gas-turbine engine, comprising:
    applying a solid membrane to a surface of a component of a gas-turbine engine, the solid membrane comprising a metallic foil, the solid membrane having a thickness and at least one kerf extending through the thickness to define a kerf pattern wherein the kerf pattern is defined by at least one elongated slit passing through the solid membrane and having a width of between 0.002 and 0.006 inches, wherein the solid membrane comprises a metallic foil selected from the group consisting of foils of titanium alloy, nickel alloy, stainless ferrous alloy and combinations thereof, and wherein the kerf pattern defines a reticulated kerf pattern such that the monolithic foil is a monolithic membrane structure; and
    bonding the solid membrane to the surface.

9. The method of claim 8, wherein the surface is a compound-curved surface, and wherein the applying step conforms the solid membrane to the compound-curved surface.

10. The method of claim 8, wherein the bonding step comprises adhesively bonding the solid membrane to the component.

* * * * *